July 4, 1939.　　　　J. D'A. CLARK　　　　2,164,498
APPARATUS FOR SAMPLING LIQUIDS
Filed July 26, 1935　　　2 Sheets-Sheet 1
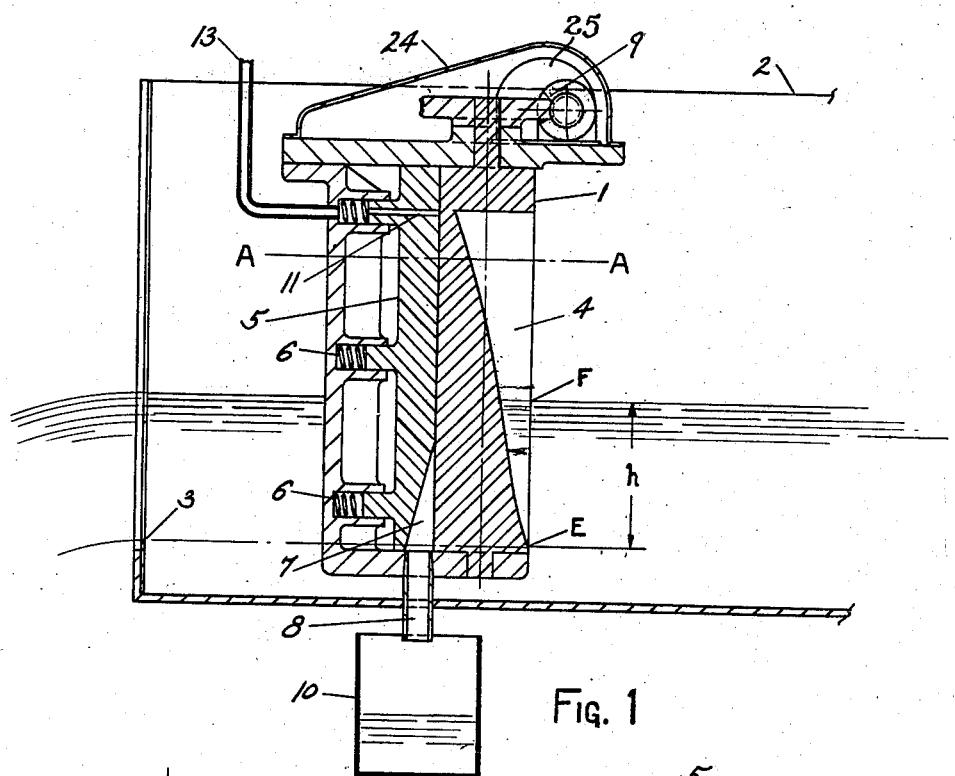
Fig. 1
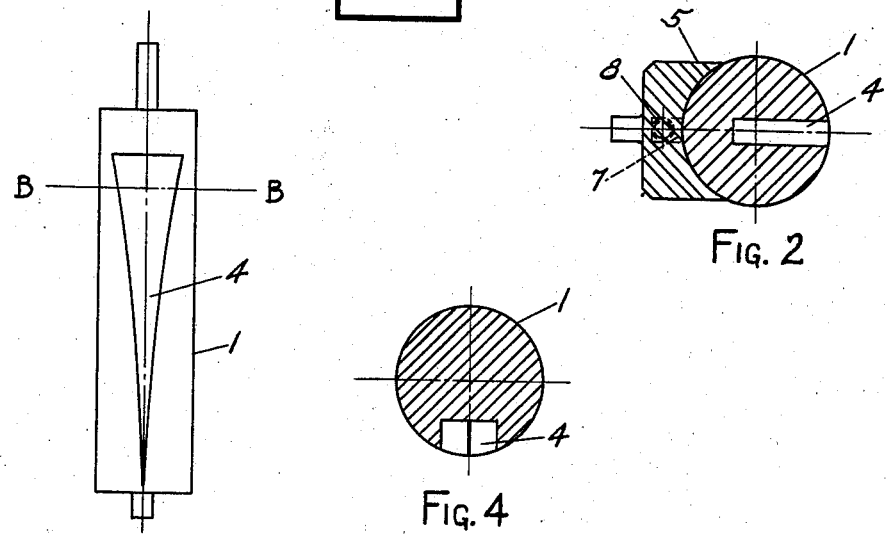
Fig. 2
Fig. 3　　　Fig. 4
INVENTOR
James d'A. Clark

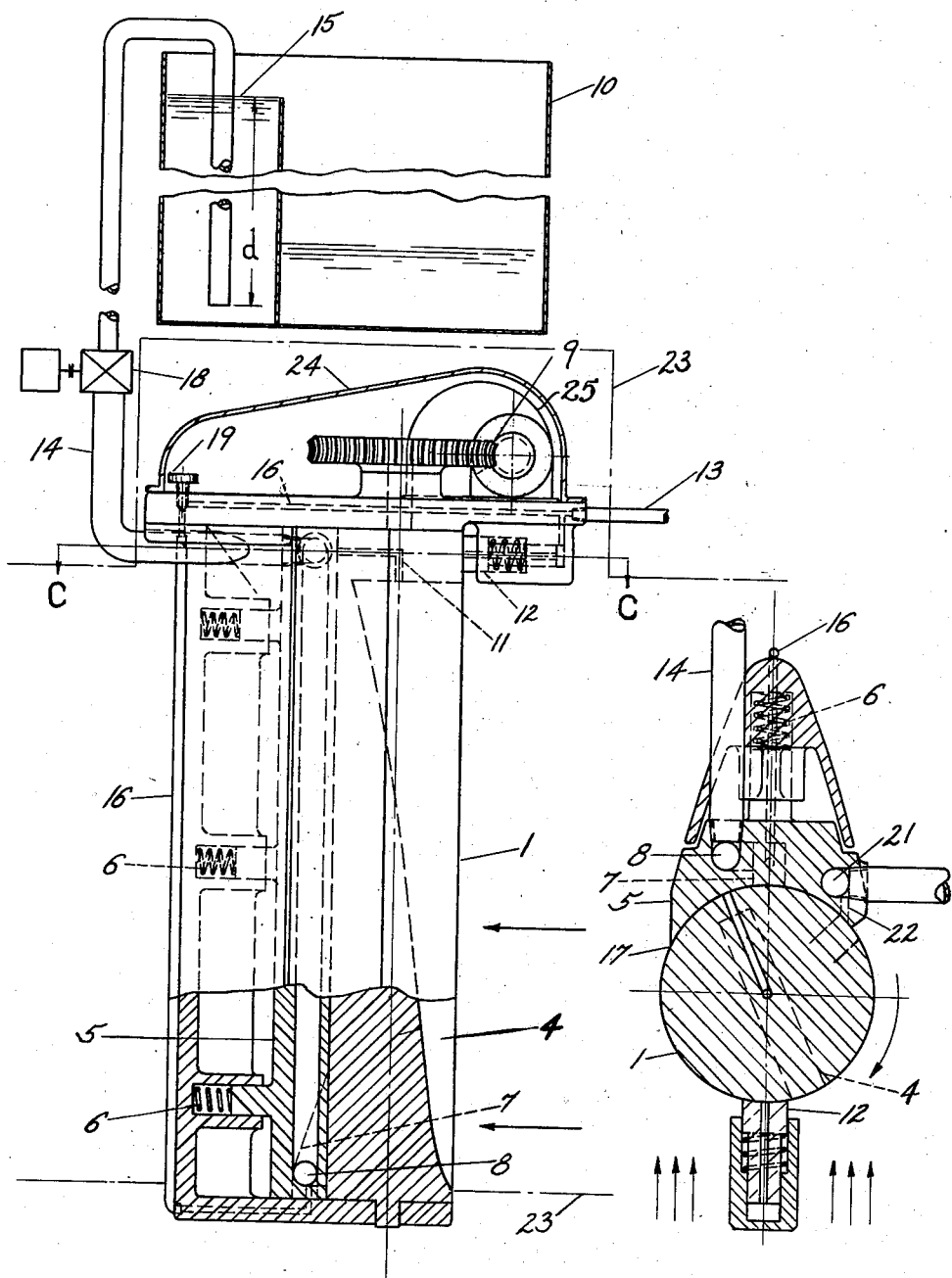

Patented July 4, 1939

2,164,498

UNITED STATES PATENT OFFICE 2,164,498

APPARATUS FOR SAMPLING LIQUIDS

James d'A. Clark, Swarthmore, Pa.

Application July 26, 1935, Serial No. 33,311

6 Claims. (Cl. 73—21)

This invention relates to the sampling of liquids, more particularly to extracting a periodic sample of a liquid corresponding to a predetermined fraction of the whole flowing past a given point.

A number of methods and mechanisms have been proposed hitherto for extracting from a flowing stream containing suspended solid matter, a sample of liquid proportional in quantity to such flow and corresponding in quality to such liquid, but as far as is known, all are open to practical objections on one or more of the following grounds: The volume of the sample taken may not be strictly proportional to the volume of the flow; the quality of the sample of a liquid containing suspended solids may be vitiated, either by the separation of the solids during sampling, or by the extraction of the sample from the top or the bottom strata only of the stream of liquid, when an undue proportion of the lighter or heavier suspended material may be included. There may be a disturbance of the flow of the stream when weir measurements are to be taken; and there is the liability of the apparatus to be rendered inaccurate or inoperative by the accumulation of trash or solid materials.

By the use of this invention all the difficulties cited may be avoided and a simple form of apparatus is provided to continuously extract and deliver a sample of the liquid from an open stream into a container, the total quantity in which is a known fraction of the total volume of liquid which has flowed past the sampling point, and the quality of the sample so collected accurately corresponds to the average quality of the liquid which has flowed past during the sampling period.

A further object of the invention is to proide a liquid sampling mechanism which is simple in construction and in operation, which will not readily be made inoperative or inaccurate by suspended solids or trash in such liquid and which delivers a qualitative sample of such liquid directly proportional to the rate of flow of said liquid.

Another object of the invention is to provide such a mechanism which will effectively deliver a qualitative and proportional sample of liquid containing suspended solids to a substantial height above the sampling level.

Other objects and advantages of the invention will be apparent from the description here set forth and from the accompanying drawings and from the claims.

In the drawings, Fig. 1 shows a vertical section of a preferred form of the apparatus in position in a weir box.

Fig. 2 shows a horizontal section of the sampling cylinder and sample receiver shown in Fig. 1 through the line AA.

Fig. 3 shows an elevation af an alternative form of sampling cylinder.

Fig. 4 shows a horizontal section thereof through the line BB.

Fig. 5 shows another form of the apparatus in position in an underground sewer.

Fig. 6 shows a horizontal section of such apparatus through the line CC.

Apparatus constructed according to this invention may take the form of a sample container 1 with a groove 4, so shaped that the volume of the sample contained by it is exactly proportional to the volume of the liquid to be sampled which is flowing past the sampler, for example, in Fig. 1, the apparatus is shown in position in a trough 2 above a 90° V notch weir 3. When there is no flow over the weir, the level of the liquid will be at the bottom of the notch, or apex of the weir. In consequence the sampler is so positioned that at the point E which is the bottom of groove 4, is level with the bottom of the notch, at which level no liquid is contained by the groove 4. Suppose now that the volume of liquid flowing is such that its level over the weir is at F and $h$ is the vertical distance between E and F. Then the volume flowing over the weir in gallons per minute is given by the well known formula $3.3\ h^{2.7}$ for a 90° V notch weir, where $h$ is the depth in inches of the water above the apex of the weir. Accordingly for this case, the groove in the sample container 1 is so shaped that the volume contained between the horizontal planes through E and F is proportional to $h^{2.7}$. Figs. 1, 2, 5 and 6 show such a sample container having a groove or slot 4 of constant width but of varying depth, and Figs. 3 and 4 the slot 4 is of constant depth but varying width. Accordingly, for a 90° weir the horizontal depth of the slot in Fig. 1 or the width of the slot in Fig. 3, $h$ inches above the bottom of the slot, is proportional to $h^{1.7}$.

If the sampler is to be used for extracting samples from a rectangular weir, a submerged weir, or a flowing stream, the sample container is so constructed and positioned that the volume contained up to a given level is exactly proportional to the flow of the stream when at such level. In general for a sample container having a groove with parallel sides, the horizontal depth of the groove at any point $h$ inches above the level of the stream at which no flow occurs, is proportional to $$\frac{d}{dh}Q$$

where Q is the flow of the stream. Where the sides of such container are not parallel, then the container is so shaped that the volume it contains at any depth is proportional to the rate of flow after the relationship between the depth of any stream and its rate of flow has been established.

Positioned against the sample container 1, which in the drawings conveniently takes the form of a cylinder, is the sample receiver or shoe 5 shaped to fit closely against the sample container and firmly but yieldingly pressed against it by means of springs 6. In the bottom of the shoe is an opening 7 connected to the sample outlet pipe 8. In the drawings the sample container 1 is rotated or oscillated about the shoe 5 by any well known means, a mechanism for this purpose, taking the form of a geared electric motor unit 25 and a worm wheel drive indicated at 9, and preferably enclosed by a watertight housing 24.

The actuating mechanism 9 is so arranged that the groove in the sample container is first open to the liquid to be sampled and then brought so as to connect with the opening 7 so that the sample may be discharged through the pipe 8 into a can or barrel 10 for gathering the samples so taken. In practice it has been found convenient to arrange for the apparatus to deliver a sample once per minute.

Considering a form of the invention as shown in Figs. 1 and 2, for the purposes of illustration, the sample container or cylinder is assumed to rotate clockwise as viewed from above. The shaped slot 4 is filled to a depth EF corresponding to that of the liquid in the position shown. As it is rotated it is first covered by the shoe 5 and on further rotation its lower end is uncovered to the opening 7 when the sample runs by gravity through the discharge pipe 8 into the can 10. An air vent to permit the liquid to flow from the slot is indicated at 11. Where it is desired that the sample be discharged to a level above that of the sampling device when slot 4 and discharge opening 7 become in alignment, vent 11 may be supplied with air pressure through supply pipe 13, or, as shown in Figs. 5 and 6, when the apparatus, as shown in position in an underground sewer indicated at 23, the vent 11 may be arranged to come into alignment with a hole in an auxiliary shoe 12, to which is applied air pressure through pipe 13 and consequently, when the liquid contained in the slot 4 is connected to the discharge opening 7, it will be blown through discharge pipe 8, which conveniently may be contained in the shoe 5 as indicated, and therefrom through pipe 14 into the sample holding can 10. By properly proportioning the size of the pipes and the admission of the air, the entire sample may be blown out in the form of a slug of liquid to a height much greater than the height of water corresponding to the air pressure available.

In order to guard continually against any possible leakage of the liquid, other than that sampled, into opening 7, it is desirable as indicated in Figs. 5 and 6, to provide a small leak of compressed air from supply 13 through pipe 16 and regulating valve 19 to the opening 7, and to provide for a continuous back pressure in the discharge pipe 14 of magnitude $d$ inches of water, corresponding to the maximum depth which the sample container 1 is immersed in the liquid to be sampled. In this way an air pressure in 7 is maintained at all times at least equivalent to the pressure corresponding to the depth which the sample container is immersed in the liquid, so that if there is any leak, as for example when the position of the shoe is temporarily disturbed by a small piece of trash, air will leak out into the liquid and prevent any liquid entering the opening 7, except as required. The requisite back pressure conveniently may be obtained by dipping the discharge pipe 14, $d$ inches into an auxiliary container 15 positioned in the can 10.

The pressure necessary to blow the sample up through the pipe 14 to a substantial height, may be further reduced in several well known ways, for example by inserting in pipe 14, a constantly revolving liquid pump as indicated at 18.

The form of apparatus shown tends to be self cleaning, for example in Fig. 6 a piece of trash resting against the edge of the slot 4 when the latter is in the position shown, will tend to be washed away by the flow of the stream after the cylinder 1 has rotated through about 90° and further by the clearing action of the edge 17 of the shoe 5. In the event however, that a piece of hard stuff lodges in the slot 4, which, judging by continued operation of the sampler over a long period of time is most improbable, the protruding portion may be sheared off by the edge 17, or else it will force the shoe 5 away from the cylinder 1, and, when the air is admitted to blow out the sample, the escape of air through the opening so formed and attendant surging will usually either disintegrate the object or else position it so as to cause it to be released by the stream of liquid or edge 17 when again exposed. For sewers containing much grease and slimy material, the self cleaning properties of the sampler may be further improved by the provision of a cleaning spray. For this purpose, as shown in Fig. 6 an elongated nozzle 22 is conveniently located in the shoe 5 through which compressed air, high pressure water or steam may be forced from the supply pipe 21 into the slot 4 as it passes over the nozzle when in the position shown by the dotted lines and the slot will be continually scoured and kept clean. However it is found that for many purposes, even under severe conditions such as paper mill sewers, the provision of such auxiliary cleaning means is unnecessary.

In order to accurately estimate the volume of liquid which has flowed past the sampling point from the volume of the liquid contained in can 10, the motor driving the mechanism 9 is either of the synchronous type, when the number of individual samples taken during the sampling period may be calculated, or else the number of rotations of the cylinder during the sampling period are counted by any well known means so that when the volume of the sample liquid in the can 10 is measured and divided by the total number of samples taken, the average flow may be accurately determined and an analysis of such sample will be a true average analysis of all the liquid which has passed the sampling liquid point over a known period.

While the foregoing description deals with preferred embodiments of the invention, a number of modifications will be obvious to one skilled in the art. It also will be obvious that the desired results may be obtained by any convenient means of inserting to a definite depth in the stream of liquid to be sampled, a vessel shaped and adapted to contain a sample of the liquid in exact proportion to the volume flowing at the moment of sampling and then causing the sample to be withdrawn at regular intervals and emptied into a suitable container, the volume of the flow being calculated from the volume collected in such container, and the number of samples taken, and the average quality of the liquid corresponding to the quality of the collected sample.

In the claims the word sampling is understood to mean the obtaining of a sample for the purpose of estimating the average quality and/or the quantity of the liquid which has flown past the sampling point in a given time.

I claim:

1. An apparatus for sampling a stream of liquid whose rate of flow is a known function of its level comprising a container element positioned at a fixed depth in said stream which container is slotted or hollowed out in such a way that irrespective of the level of the said stream it encloses a sample of the liquid the upper surface of which coincides with the surface level of said stream and whose volume is equal to a constant multiplied by the rate of flow of said stream and means for periodically connecting the sample so contained to a discharge pipe and discharging the sample into a vessel.

2. An apparatus for sampling a stream of liquid whose rate of flow is a known function of its level comprising a container element positioned at a fixed depth in said stream which container is slotted or hollowed out in such a way that irrespective of the level of said stream it encloses a sample of the liquid whose volume is equal to a constant multiplied by the rate of flow of said stream and means for periodically connecting the bottom of the sample so contained to a discharge pipe and the top of the sample so contained to a compressed air supply for discharging the sample to a level above that of the surface of the stream.

3. An apparatus for sampling a stream of liquid whose rate of flow is a known function of its level, comprising a container element positioned at a fixed depth in said stream which container is slotted or hollowed out in such a way that irrespective of the level of said stream it encloses a sample of liquid whose volume is equal to a constant multiplied by the rate of flow of said stream, a shoe pressed against such element, a discharge pipe connected to such shoe and means for periodically connecting the sample so enclosed to the discharge pipe for discharging the sample.

4. An apparatus for sampling a stream of liquid comprising a container fixedly immersed in such stream and means whereby said container is arranged to enclose periodically a sample of liquid, means for connecting the sample so enclosed to a discharge pipe for discharging the sample, and means for maintaining a continuous air pressure in the discharge pipe substantially equivalent to the liquid pressure at the base of the container element so as to prevent leakage of the liquid inward to the discharge pipe.

5. An apparatus for sampling a stream of liquid comprising a container element positioned at a fixed depth in such stream and so slotted or hollowed out as to enclose a sample of such liquid, a shoe yieldingly pressed against such element, a fluid discharge nozzle for directing a stream of cleansing fluid into the slot in the container element and means for periodically connecting the sample so enclosed to a discharge pipe for discharging the sample and means for thereafter subjecting the said slot to the action of the cleansing fluid from the said nozzle.

6. In a device for sampling a stream of liquid whose level is a known function of its volume of flow, an element having a chamber which is adapted to enclose a sample of the liquid, said chamber being shaped other than of uniform cross section so that its area across any horizontal plane coinciding with a given level of the stream is a constant proportion of the first differential of the volume of the flow of the stream with respect to its level.

JAMES d'A. CLARK.